United States Patent

[11] 3,542,471

| | | |
|---|---|---|
| [72] | Inventor | Ladislav Dubny |
| | | Prerov, Czechoslovakia |
| [21] | Appl. No. | 626,239 |
| [22] | Filed | March 27, 1967 |
| [45] | Patented | Nov. 24, 1970 |
| [73] | Assignee | Meopta narodni podnik |
| | | Prerov, Czechoslovakia |
| [32] | Priority | March 26, 1966 |
| [33] | | Czechoslovakia |
| [31] | | No. PV2024-66 |

[54] FILM HOLDER FOR A PROJECTION APPARATUS
3 Claims, 4 Drawing Figs.

[52] U.S. Cl. .................................................. 355/75,
355/133
[51] Int. Cl. ....................................................G03b 27/62
[50] Field of Search........................................... 355/75;
95/94, 100

[56] References Cited
UNITED STATES PATENTS

| 2,424,052 | 7/1947 | Pratt et al. ..................... | 95/94 |
| 2,553,014 | 5/1951 | Singer .......................... | 95/94X |
| 3,043,206 | 7/1962 | Fulton.......................... | 95/94 |
| 2,221,218 | 11/1940 | Morin........................... | 355/75 |

Primary Examiner—Norton Ansher
Assistant Examiner—Richard L. Moses
Attorney—Richard Low ABSTRACT: A film holder for a projection printer of the type in which one frame of an elongated strip of film is exposed while clamped horizontally between two apertured plates. The lower of the plates carries an axially extending storage receptacle for the film ends which have concave spherically curved receiving surfaces. The film makes edge point contact with the receiving surfaces which have an arcuate line of intersection with any plane intersecting the longitudinal axis of the film.

INVENTOR.
Ladislav Dubný

FILM HOLDER FOR A PROJECTION APPARATUS

BACKGROUND OF THE INVENTION

This invention relates to projection apparatus, and particularly to a projection printer for producing enlarged or other prints from a negative carried on flexible film.

In its more specific aspects, the invention is concerned with an improvement in a film holder of such a printer in which the projected portion of the film is supported in a plane while an image on the film is projected through a gate, and at least one of the two ends of the film is stored on a portion of the film holder offset from the gate portion which supports the projected part of the film.

Known film holders are equipped with storage portions in which the coiled film end rests on a cylindrically concave receiving surface. The outer, approximately cylindrical surface of the film coil is in contact with the receiving surface along a line which extends transversely to the longitudinal film axis over the width of the film. During film advance, there is frictional contact between the film end and the receiving surface practically over one entire film surface. Damage to the emulsion or to the surface of the carrier by abrasion is difficult to avoid.

The object of the invention is the provision of an improved film holder of the type referred to in which frictional engagement between a stored film end and the receiving surface of the storage portion of the film holder is limited substantially to point contact between the receiving surface and the very edge of the film.

SUMMARY OF THE INVENTION

This object is achieved by giving the concave receiving surface a shape defining a continuously arcuate line of intersection with any plane which is perpendicular to the plane in which the projected film portion is supported, and particularly with the planes perpendicular to the film axis.

This condition is satisfied in the simplest manner by a receiving surface which is spherically curved, but other surface shapes may be chosen. The negative holder may be provided with two storage portions at opposite ends of the gate portion and having the receiving surfaces of the invention. If at least one of the storage portions has an end face transverse of the longitudinal film axis and remote from the gate portion, scratching of a film hanging over the end face can be safely avoided by making the line of intersection between the end face and the receiving surface a concave arcuate line.

Other features and many of the attendant advantages of this invention will be readily appreciated from the following detailed description of a preferred embodiment when considered in connection with the accompanying drawing.

DESCRIPTION OF THE PREFERRED EMBODIMENT

Figure 1:
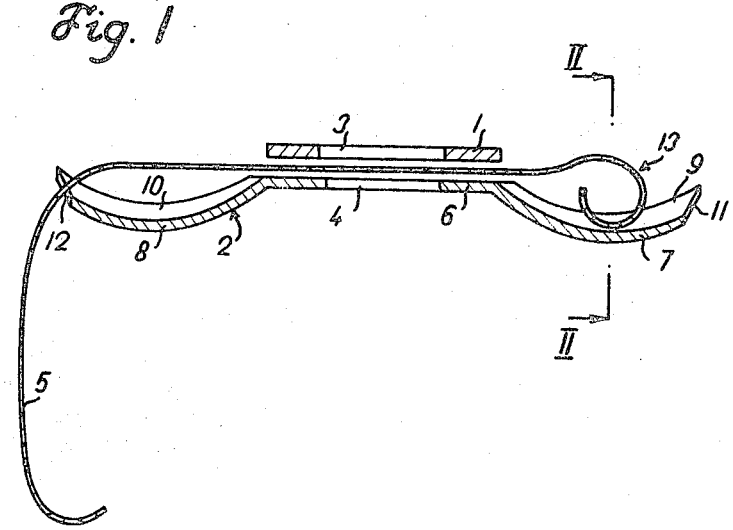
FIG. 1 shows a film holder of the invention in elevational section on the axis of a film held therein.

The film holder shown in FIG. 1 consists of two plates 1 and 2 equipped with nonillustrated register pins and corresponding openings which hold the plates in alinement of their gate openings 3,4 when the film holder is positioned in a projection printer in a conventional manner. The plate 1 is clamped against the plates 2 during operation of the printer so that a frame of a film 5 is held flat in a plane defined by the gate portion 6 of the plate 2.

The storage portions 7,8 of the plate 2 are offset from the gate portion 6 in opposite directions along the longitudinal axis of the film 5. Their normally upwardly directed receiving surfaces 9,10 are concave and spherically curved. Their end faces 11,12 remote from the gate portion 6 and transverse of the axis of the clamped film portion define approximately circular concave arcs with the receiving surfaces 9,10 respectively.

Figure 2:
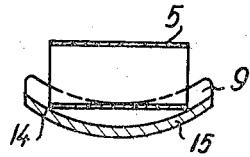
FIG. 2 shows the apparatus of FIG. 1 in section on the line II-II.
Figure 3:
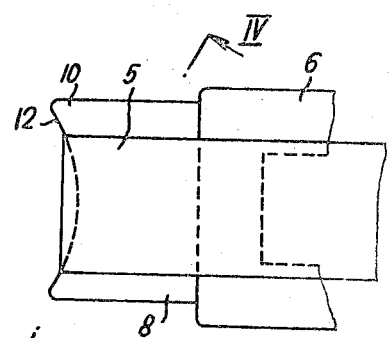
FIG. 3 is a fragmentary plan view of the apparatus of FIG. 1.
Figure 4:
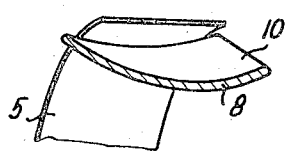
FIG. 4 shows the device of FIG. 3 in section on the line IV-IV.

In the position of the film shown in the drawing, one end of the film 5 forms an approximately cylindrical coil 13 whose edges 14,15 make point contact with the receiving surface 9 as is best seen in FIG. 2. The other film end hangs limply over the end face 12 of the storage portion 8, and makes contact with the plate 2 only in points along its edges. When the film is advanced to expose another frame in the printer, not shown, frictional engagement between the film 5 and the film holder is limited to the very edges of the film, not relevant to the quality of the produced print, if the usual precautions are taken to avoid contact between the holder and the film in the gate area during film advance. Dust particles present on the receiving surfaces 9,10 can neither do significant damage to the stored film ends nor be carried into the gate area by the advancing film.

It will be appreciated that the advantages of the invention are not limited to the use of film of any specific width with the film holder. If the size of the projected image is determined by the gate opening 3 in the clamping plate 1, and if several plates 1 with different gate openings are available for use with the same plate 2, films of different widths are protected against abrasion by the configuration of the receiving surfaces 9, 10 and of the end faces 11,12.

While the invention has been described with specific reference to a projection printer and to the use of a negative film, it may be used to advantage in projection apparatus in which the exposure of sensitized print material is not contemplated and in which the images on the film are not negative.

I claim:

1. A film holder for a projection apparatus comprising a gate portion defining a plane of support and formed with an aperture therethrough perpendicularly to said plane, a clamping portion for holding a portion of an elongated film having a longitudinal axis in said plane in contact with said gate portion, a storage portion offset from said gate portion in the direction of said axis having a spherical concave receiving surface for receiving thereon another portion of said film, said receiving surface defining a continuously arcuate line of intersection with any plane intersecting the longitudinal axis of the position of said film held in said plane of support.

2. In a film holder as set forth in claim 1, said receiving surface further defining a continuously arcuate line of intersection with any plane perpendicular to said plane of support.

3. In a film holder for a projection apparatus having a gate portion defining a plane of support and formed with an aperture therethrough perpendicularly to said plane, a clamping portion for holding a portion of an elongated film having a longitudinal axis in said plane in contact with said gate portion, a storage portion offset from said gate portion in the direction of said axis having a concave receiving surface for receiving thereon another portion of said film, the improvement in the storage portion comprising said receiving surface defining a continuously arcuate line of intersection with any plane perpendicular to the longitudinal axis of the portion of said film held in said plane of support, and having an end face transverse of said axis remote from said gate portion, said end face intersecting said receiving surface in an arcuate concave line.